United States Patent
Min et al.

(10) Patent No.: US 8,379,368 B2
(45) Date of Patent: Feb. 19, 2013

(54) METHOD FOR MANUFACTURING LITHIUM ION CAPACITOR AND LITHIUM ION CAPACITOR MANUFACTURED USING THE SAME

(75) Inventors: Hong Seok Min, Gyunggi-do (KR); Bae Kyun Kim, Gyunggi-do (KR); Hyun Chul Jung, Gyunggi-do (KR); Dong Hyeok Choi, Gyunggi-do (KR); Hak Kwan Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 191 days.

(21) Appl. No.: 12/926,672

(22) Filed: Dec. 2, 2010

(65) Prior Publication Data

US 2012/0008254 A1 Jan. 12, 2012

(30) Foreign Application Priority Data

Jul. 7, 2010 (KR) .................. 10-2010-0065447

(51) Int. Cl.
 *H01G 9/035* (2006.01)
(52) U.S. Cl. ........ 361/505; 361/502; 361/504; 361/512; 361/525; 361/528
(58) Field of Classification Search .................. 361/505, 361/502, 503–504, 516–519, 523–525, 528–529, 361/509–512
See application file for complete search history.

(56) References Cited

U.S. PATENT DOCUMENTS

| | | | |
|---|---|---|---|
| 6,669,860 B1 * | 12/2003 | Maruyama et al. | 252/62.2 |
| 7,052,803 B2 * | 5/2006 | Kato et al. | 429/231.8 |
| 7,206,186 B1 * | 4/2007 | Knight et al. | 361/301.3 |
| 7,256,982 B2 * | 8/2007 | Lessner et al. | 361/516 |
| 7,715,174 B1 * | 5/2010 | Beauvais et al. | 361/528 |
| 7,848,081 B2 * | 12/2010 | Tanizaki et al. | 361/525 |

FOREIGN PATENT DOCUMENTS

| | | |
|---|---|---|
| JP | 6-243868 | 9/1994 |
| JP | 2000-150319 | 5/2000 |
| JP | 2000-215918 | 8/2000 |
| JP | 2002-83589 | 3/2002 |
| JP | 2005-104735 | 4/2005 |
| JP | 2008-124227 | 5/2008 |
| JP | 2008-311363 | 12/2008 |
| KR | 10-0639431 B1 | 10/2006 |

OTHER PUBLICATIONS

Korean Office Action issued Aug. 11, 2011 in corresponding Korean Patent Application 10-2010-0065447.
Japanese Office Action issued Oct. 16, 2012 in corresponding Japanese Patent Application No. 2010-275005.
Japanese Notice of Information Provision issued Nov. 6, 2012 in corresponding Japanese Patent Application No. 2010-275005.

* cited by examiner

*Primary Examiner* — Nguyen T Ha

(57) ABSTRACT

A method for manufacturing a lithium ion capacitor, and a lithium ion capacitor manufactured using the method are provided. The method for manufacturing a lithium ion capacitor includes: disposing a lithium metal on a capacitor cell including a cathode, a separation film, and an anode; impregnating the capacitor cell with electrolyte including a lithium salt; changing the cathode and the anode to allow lithium ions within the electrolyte to be occluded into the anode; performing a primary reaction in which the cathode and the lithium metal are short-circuited to emit anions from the cathode and lithium ions from the lithium metal and a secondary reaction that the lithium ions emitted from the lithium metal are occluded into the cathode; and recharging the cathode and the anode to allow the lithium ions, which have been occluded into the cathode and the lithium ions within the electrolyte, to be occluded into the anode.

7 Claims, 3 Drawing Sheets

METHOD FOR MANUFACTURING LITHIUM ION CAPACITOR AND LITHIUM ION CAPACITOR MANUFACTURED USING THE SAME

CROSS-REFERENCE TO RELATED APPLICATIONS

This application claims the priority of Korean Patent Application No. 10-2010-0065447 filed on Jul. 7, 2010, in the Korean Intellectual Property Office, the disclosure of which is incorporated herein by reference.

BACKGROUND OF THE INVENTION

1. Field of the Invention

The present invention relates to a method for manufacturing a lithium ion capacitor and a lithium ion capacitor manufactured using the same and, more particularly, to a method for manufacturing a lithium ion capacitor capable of obtaining a high output density and excellent capacity and reducing a manufacturing process time, and a lithium ion capacitor manufactured using the same.

2. Description of the Related Art

In various electronic products such as an information communication device, and the like, a stable energy supply is an important factor. In general, such a function is performed by a capacitor. Namely, the capacitor serves to collect electricity in circuits of the information communication device and various electronic products and output it, thus stabilizing the flow of electricity within the circuits. A general capacitor has a very short charging and discharging time and a high output density, but because it has a low energy density, it has limitations in being used as an energy storage device.

Thus, in order to overcome such limitations of a general capacitor, recently, a novel capacitor such as an electrical double layer capacitor (EDLC) has been developed, which has come into prominence as a next-generation energy device along with a rechargeable battery or a secondary battery.

Also, recently, diverse electrochemical elements, whose operating principles are based on similar principles to those of an ELDC, have been developed, and an energy storage device called a hybrid capacitor, formed by combining power storage principles of a lithium ion secondary battery and the ELDC, has come into prominence. As a hybrid capacitor, a lithium ion capacitor, in which a hole is formed to penetrate both surfaces (i.e., front and rear surfaces) of a cathode current collector and those of an anode current collector, a material which can reversibly carry lithium ions is used as an anode electrode material, a lithium metal is disposed to oppose an anode (negative electrode) or a cathode (positive electrode), and lithium ions are carried to the anode according to electrochemical contact between the lithium metal and the anode or the cathode, has been proposed.

In order to dope the anode of the lithium ion capacitor with lithium ions, various methods have been attempted. For example, cathodes and anodes are formed on the collector including the hole penetrating the both surfaces thereof, and the lithium metal is disposed on a laminated body formed as the plurality of cathodes and the plurality of anodes are laminated. The anodes are doped with lithium ions emitted from the lithium metal. In this case, because lithium ions can be moved without being interrupted within the electrode current collector, the lithium ions can be electrochemically carried to the plurality of laminated anodes even in a power storage device including a large number of laminated cells.

SUMMARY OF THE INVENTION

An aspect of the present invention provides a method for manufacturing a lithium ion capacitor capable of reducing a manufacturing process time and obtaining a high output density and excellent capacity, and a lithium ion capacitor manufacturing using the same.

According to an aspect of the present invention, there is provided a method for manufacturing a lithium ion capacitor, including: disposing a lithium metal on a capacitor cell including a cathode, a separation film, and an anode; impregnating the capacitor cell with electrolyte including a lithium salt; changing the cathode and the anode to allow lithium ions within the electrolyte to be occluded into the anode; performing a primary reaction in which the cathode and the lithium metal are short-circuited to emit anions from the cathode and lithium ions from the lithium metal and a secondary reaction that the lithium ions emitted from the lithium metal are occluded into the anode; and recharging the cathode and the anode to allow the lithium ions, which have been occluded into the cathode and the lithium ions within the electrolyte, to be occluded into the anode.

The method may further include: discharging the cathode and the lithium metal to emit the anions, which have been occluded into the cathode, after the cathode and the anode are recharged.

The capacitor cell may have a form of a laminated body formed by laminating a plurality of cathodes, separation films and anodes.

The capacitor cell may have a form in which the cathode, the separation film, and the anode are wound.

The cathode and the anode may be formed by forming an electrode material, into which lithium ions can be irreversibly occluded, on a conductive sheet, and the conductive sheet may have a form of a foil or a mesh.

The short-circuiting of the cathode and the lithium metal may be performed stepwise with a voltage difference.

According to another aspect of the present invention, there is provided a lithium ion capacitor manufactured by performing the method including: disposing a lithium metal on a capacitor cell including a cathode, a separation film, and an anode; impregnating the capacitor cell with electrolyte including a lithium salt; changing the cathode and the anode to allow lithium ions within the electrolyte to be occluded into the anode; performing a primary reaction in which the cathode and the lithium metal are short-circuited to emit anions from the cathode and lithium ions from the lithium metal and a secondary reaction that the lithium ions emitted from the lithium metal are occluded into the anode; and recharging the cathode and the anode to allow the lithium ions, which have been occluded into the cathode and the lithium ions within the electrolyte, to be occluded into the anode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
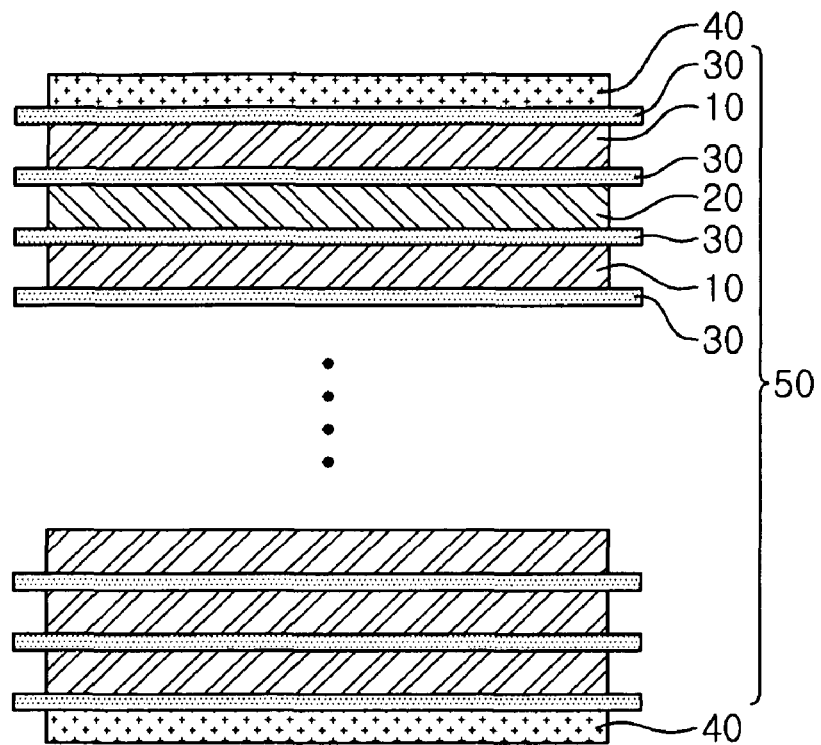
FIG. 1 is a schematic sectional view showing a capacitor cell according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
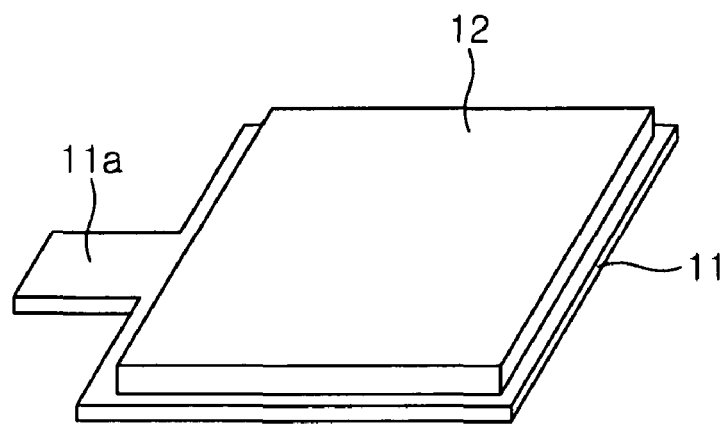
FIG. 2 is a schematic perspective view showing a cathode according to an exemplary embodiment of the present invention.
Figure 3A:
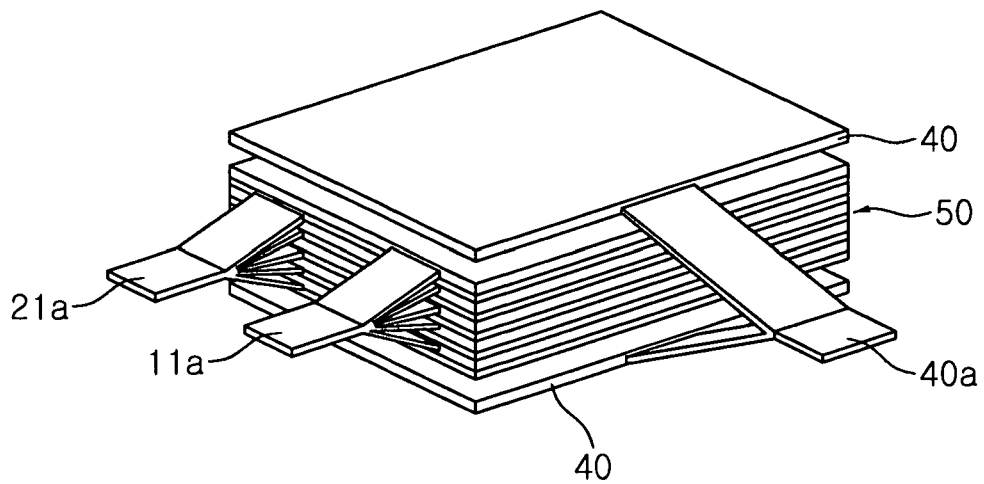
FIGS. 3a to 3c are schematic view showing the process of a method of occluding lithium ions into an anode according to an exemplary embodiment of the present invention.
Figure 3B:
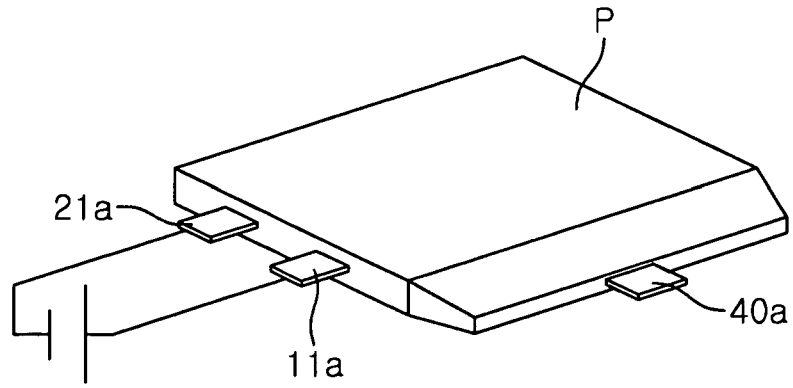
Figure 3C:
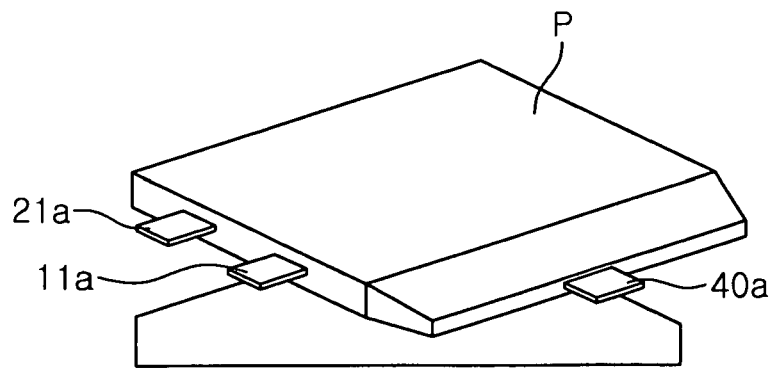
Figure 4:
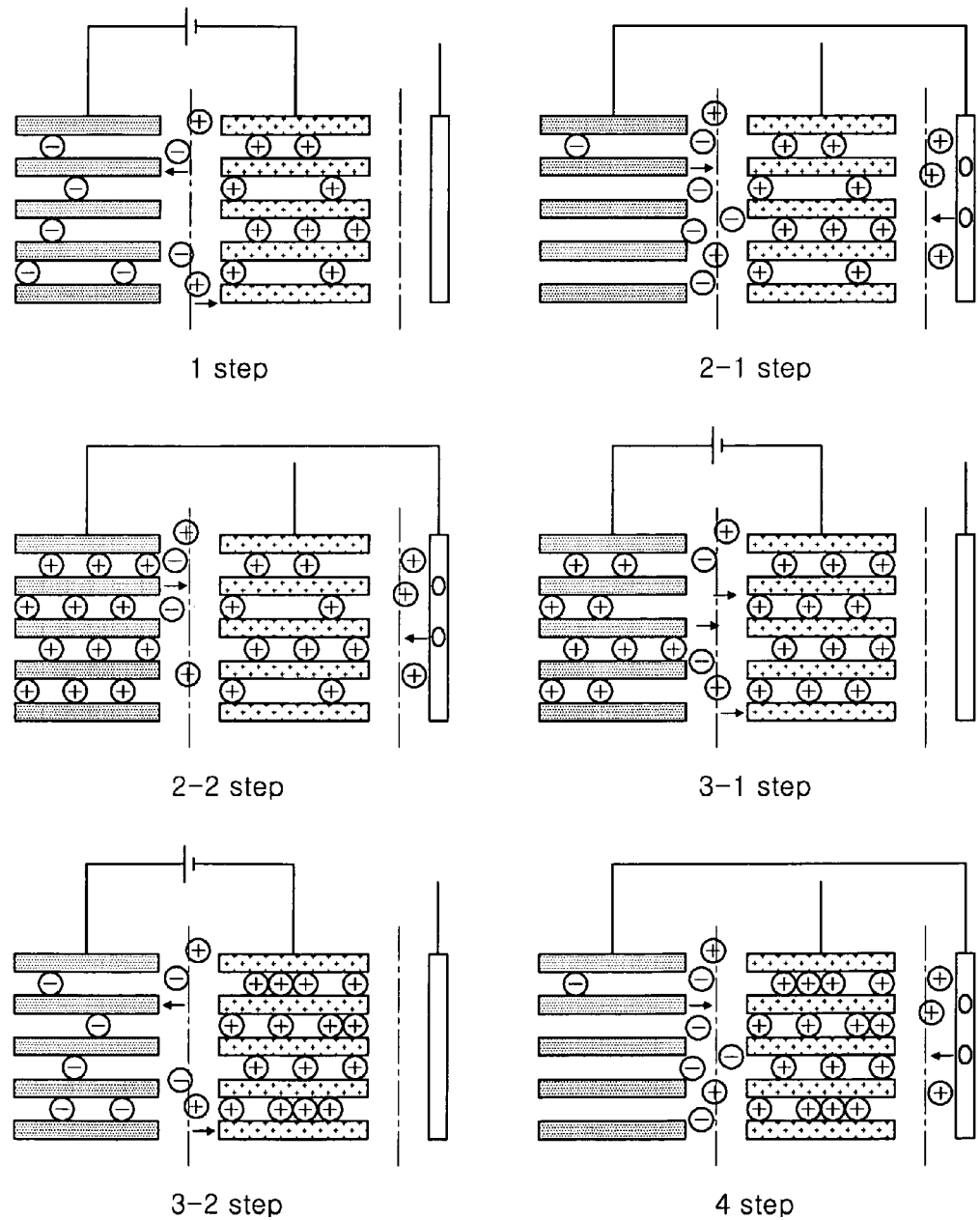
FIG. 4 schematically shows the process of occluding lithium ions into an anode according to an exemplary embodiment of the present invention.

FIG. 1 is a schematic sectional view showing a capacitor cell according to an exemplary embodiment of the present invention. FIG. 2 is a schematic perspective view showing a cathode according to an exemplary embodiment of the present invention. FIGS. 3a to 3c are schematic view showing the process of a method of occluding lithium ions into an anode according to an exemplary embodiment of the present invention. FIG. 4 schematically shows the process of occluding lithium ions into an anode according to an exemplary embodiment of the present invention.

First, as shown in FIG. 1, a cathode (or a positive electrode) 10, a separation film 30, an anode (or a negative electrode) 20 are sequentially laminated to form a capacitor cell 50. In the present exemplary embodiment, the capacitor cell 50 may be a laminated body. A plurality of cathodes 10 and a plurality of anodes 20 may be laminated to obtain a desired electric capacity.

Although not shown, the capacitor cell may have a form in which sequentially disposed cathodes, separation films, and anodes are wound.

With reference to FIG. 2, the cathode 10 may be formed by forming an electrode material 12 on a conductive sheet 11. Also, although not shown, the cathode 10 may be a double-sided electrode with the electrode material 12 formed on both sides of the conductive sheet 11.

As the electrode material 12, a material into which lithium can be irreversibly occluded may be used. For example, a carbon material such as graphite, hard carbon, or coke, a polyacene-based material, or the like, may be used as the electrode material 12, but the present invention is not limited thereto.

The cathode 10 may be made of a mixture of the electrode material 12 and a conductive material. As the conductive material, for example, acetylene black, graphite, metal powder, and the like, may be used; however, the present invention is not limited thereto.

The thickness of the electrode material 12 may range, for example, from 15 μm to 100 μm, but is not particularly limited.

The conductive sheet 11 delivers an electrical signal to the electrode material 12 and serves as a current collector for collecting accumulated electrical charges. The conductive sheet 11 may be formed as a metallic foil, a conductive polymer, or the like. The metallic foil may be made of stainless steel, copper, nickel, or the like.

The conductive sheet 11 may have a foil form or a mesh form having through holes. According to the present exemplary embodiment, lithium ions from the lithium metal are emitted to electrolyte and then absorbed into the cathode 10. After being occluded into the cathode 10, the lithium ions are delivered to the anode 20. Through this process, the conductive sheet in the foil form or the mesh form may be used according to the present exemplary embodiment.

The conductive sheet 11 may include a lead part 11a in order to apply electricity to the capacitor cell 50.

Although not shown, an electrode material may be manufactured in the form of a solid sheet so as to be used as a cathode, without using the conductive sheet.

Like the cathode 10, the anode 20 may be formed by forming an electrode material on the conductive sheet in the present exemplary embodiment.

In the present exemplary embodiment, the separation film 30 may be disposed between the cathode 10 and the anode 20 in order to electrically insulate the cathode 10 and the anode 20. The separation film 30 may be a made of a porous material allowing ions to be transmitted therethrough. The porous material may be polypropylene, polyethylene, or glass fiber, but may not be limited thereto.

A lithium metal 40 is disposed on the capacitor cell 50. In the present exemplary embodiment, lithium metals 40 are disposed on the outermost portions of the capacitor cell 50.

In the present exemplary embodiment, the lithium metal 40 serves to provide lithium ions to be occluded into the anode, and can be disposed at an appropriate position. For example, the lithium metal 40 may be disposed on the side of the capacitor cell 50.

FIG. 3a is a schematic perspective view showing the capacitor cell with lithium metals disposed thereon. With reference to FIG. 3a, lead parts 11a, 21a, and 40a are drawn out in order to apply electricity to the cathodes, the anodes, and the lithium metals.

Next, as shown in FIG. 3b, in order to impregnate the capacitor cell with electrolyte, the capacitor cell is sealed with a pouch (p), into which electrolyte may be injected. The electrolyte may not be particularly limited so long as it contains lithium salt, and an electrolyte known in the art may be used.

Then, voltage is applied to the cathode lead part 11a and the anode lead part 21a to charge the cathode and the anode.

Thereafter, as shown in FIG. 3c, the cathode and the lithium metal are short-circuited by using the cathode lead part 11a and the lithium metal lead part 40a.

Subsequently, the cathode and the anode may be recharged by using the cathode lead part 11a and the anode lead part 21a (not shown). Thereafter, the cathode and the lithium metal may be discharged by using the cathode lead part 11a and the lithium metal lead part 40a (not shown).

FIG. 4 schematically shows the process of occluding lithium ions into an anode according to an exemplary embodiment of the present invention.

When the cathode and the anode are charged, the lithium ions in the electrolyte are occluded into the anode (step 1).

Next, the cathode and the lithium metal are short-circuited to perform a primary reaction in which anions are emitted from the cathode and lithium ions are emitted from the lithium metal (step 2-1). The primary reaction may be performed with the voltage ranging from 2V to 4V.

When the voltage is continuously lowered after the primary reaction, a secondary reaction that lithium ions are occluded into the cathode is performed (step 2-2). The lithium ions occluded into the cathode may include lithium ions present in the electrolyte, but may be understood as lithium ions which have been emitted from the lithium metal. The secondary reaction may be performed at a lower voltage than that of the primary reaction. Namely, the secondary reaction may be performed while the voltage is being lowered to 0V.

The short-circuiting of the cathode and the lithium metal may be slowly performed stepwise with a potential difference in order to perform the primary reaction and the secondary reaction.

Thereafter, when the cathode and the anode are recharged, lithium ions are occluded into the anode. In detail, lithium ions which have been occluded into the cathode are emitted into the electrolyte so as to be occluded into the anode (step 3-1) and the lithium ions present in the electrolyte are occluded into the anode (step 3-2).

In this case, lithium ions are occluded into the anode by the amount balancing with the cathode. Namely, the lithium ions, which have been occluded into the cathode, are emitted to be occluded into the anode, and lithium ions by the amount of anions occluded into the cathode are additionally occluded into the anode.

Namely, in the present exemplary embodiment, lithium ions are occluded into the cathode according to the short-circuiting of the cathode and the lithium metal, and accordingly, the amount of lithium ions occluded into the anode later increases.

Thereafter, the cathode and the lithium metal may be discharged to emit anions present in the cathode.

After lithium ions are occluded into the anode in the foregoing manner, one side of the pouch may be cut to emit a generated gas, and the installed lithium metal may be removed to thus complete the lithium ion capacitor.

According to the present exemplary embodiment, because the cathode is utilized as a storage medium of lithium ions, the amount of lithium ions occluded into the anode can be increased. Accordingly, time can be shortened compared with the related art lithium ion occlusion process.

In addition, another exemplary embodiment of the present invention may provide a lithium ion capacitor. The lithium ion capacitor according to the present exemplary embodiment can have an increased amount of lithium ions occluded into the cathode, so it can have high capacity and high output density.

As set forth above, according to exemplary embodiments of the invention, a cathode can be utilized as a storage medium of lithium ions, so the amount of lithium ions finally occluded into an anode can be increased. Thus, time can be shortened compared with the related art process of occluding lithium ions.

In addition, because the amount of lithium ions occluded into the anode of the lithium ion capacitor is increased, the lithium ion capacitor can have an increased capacity and a high output density.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for manufacturing a lithium ion capacitor, the method comprising:
    disposing a lithium metal on a capacitor cell including a cathode, a separation film, and an anode;
    impregnating the capacitor cell with electrolyte including a lithium salt;
    charging the cathode and the anode to allow lithium ions within the electrolyte to be occluded into the anode;
    performing a primary reaction in which the cathode and the lithium metal are short-circuited to emit anions from the cathode and lithium ions from the lithium metal and a secondary reaction that the lithium ions emitted from the lithium metal are occluded into the cathode; and
    recharging the cathode and the anode to allow the lithium ions, which have been occluded into the cathode and the lithium ions within the electrolyte, to be occluded into the anode.

2. The method of claim 1, further comprising:
    discharging the cathode and the lithium metal to emit the anions, which have been occluded into the cathode, after the cathode and the anode are recharged.

3. The method of claim 1, wherein the capacitor cell has a form of a laminated body formed by laminating a plurality of cathodes, separation films and anodes.

4. The method of claim 1, wherein the capacitor cell has a form in which the cathode, the separation film, and the anode are wound.

5. The method of claim 1, wherein the cathode and the anode are formed by forming an electrode material, into which lithium ions can be reversibly occluded, on a conductive sheet, and the conductive sheet may have a form of a foil or a mesh.

6. The method of claim 1, wherein the short-circuiting of the cathode and the lithium metal is performed stepwise with a voltage difference.

7. A lithium ion capacitor manufactured by performing the method comprising:
    disposing a lithium metal on a capacitor cell including a cathode, a separation film, and an anode;
    impregnating the capacitor cell with electrolyte including a lithium salt;
    charging the cathode and the anode to allow lithium ions within the electrolyte to be occluded into the anode;
    performing a primary reaction in which the cathode and the lithium metal are short-circuited to emit anions from the cathode and lithium ions from the lithium metal and a secondary reaction that the lithium ions emitted from the lithium metal are occluded into the cathode; and
    recharging the cathode and the anode to allow the lithium ions, which have been occluded into the cathode and the lithium ions within the electrolyte, to be occluded into the anode.

\* \* \* \* \*